(12) United States Patent
Liu et al.

(10) Patent No.: US 8,574,522 B2
(45) Date of Patent: Nov. 5, 2013

(54) PROCESS FOR SELECTIVE OXIDATIVE DEHYDROGENATION OF A HYDROGEN-CONTAINING CO MIXED GAS

(75) Inventors: Juntao Liu, Shanghai (CN); Siqin Li, Shanghai (CN); Linna Zhang, Shanghai (CN); Lei Li, Shanghai (CN); Jun Kuai, Shanghai (CN)

(73) Assignees: China Petroleum & Chemical Corporation, Beijing (CN); Shanghai Research Institute of Petrochemical Technology Sinopec, Shanghai (CN)

( * ) Notice: Subject to any disclaimer, the term of this patent is extended or adjusted under 35 U.S.C. 154(b) by 284 days.

(21) Appl. No.: 13/087,798

(22) Filed: Apr. 15, 2011

(65) Prior Publication Data

US 2011/0263726 A1    Oct. 27, 2011

(51) Int. Cl.
 *C01B 17/16*     (2006.01)
 *C07C 7/152*     (2006.01)

(52) U.S. Cl.
 USPC .......................................... 423/224; 585/850

(58) Field of Classification Search
 USPC .......................................... 423/224; 585/850
 See application file for complete search history.

(56) References Cited

U.S. PATENT DOCUMENTS

| | | | | |
|---|---|---|---|---|
| 3,886,090 A * | 5/1975 | Bertus | ............................ | 502/215 |
| 6,069,288 A * | 5/2000 | Ou et al. | ....................... | 585/800 |
| 2003/0208095 A1 | 11/2003 | Budin et al. | | |
| 2004/0015031 A1* | 1/2004 | Messenger | ..................... | 585/658 |

FOREIGN PATENT DOCUMENTS

| | | |
|---|---|---|
| CN | 1172790 A | 2/1998 |
| CN | 1649807 A | 8/2005 |

* cited by examiner

*Primary Examiner* — Jafar Parsa
(74) *Attorney, Agent, or Firm* — Finnegan, Henderson, Farabow, Garrett & Dunner LLP

(57) ABSTRACT

A process for selective oxidative dehydrogenation of a hydrogen-containing CO mixed gas, comprising contacting a hydrogen-containing CO mixed gas raw material with at least one catalyst entity having an increased activity gradient disposed in a reactor under at least one reaction condition chosen from a reaction temperature ranging from 100 to 300° C., a volume space velocity ranging from 100 to 10000 $h^{-1}$, and a reaction pressure ranging from −0.08 to 5.0 MPa, wherein the molar ratio of oxygen to hydrogen in the raw material ranges from 0.5:1 to 5:1.

31 Claims, No Drawings

PROCESS FOR SELECTIVE OXIDATIVE DEHYDROGENATION OF A HYDROGEN-CONTAINING CO MIXED GAS

This application claims priority under 35 U.S.C. §119 to Chinese Patent Application Nos. 201010147051.9 and 201010146882.4, both filed Apr. 15, 2010.

Disclosed herein are processes for selective oxidative dehydrogenation of a hydrogen-containing CO mixed gas, such as processes for selective oxidative dehydrogenation of a hydrogen-containing CO mixed gas raw material for preparation of at least one oxalate by CO coupling.

Oxalates are important organic industrial chemicals and can be substantially used for production of various dyes, medicaments, important solvents, extracting agents and intermediates in refined chemical industry. In the 21$^{st}$ century, oxalates, degradable and environmentally friendly engineering plastic monomers, have also received extensive international recognition. In addition, normal-pressure hydrolysis of an oxalate can give rise to oxalic acid, and normal-pressure aminolysis can give rise to oxalamide, which can serve as a high-quality, sustained-release chemical fertilizer. An oxalate can also be useful as a solvent and for the production of an intermediate of pharmaceuticals or dyes, through, for example, various condensation reactions with at least one ingredient chosen from fatty acid esters, cyclohexyl acetophenone, amino-alcohols and heterocyclic compounds. It can also be used for synthesizing thymine that may be useful as a medical hormone. Further, low-pressure hydrogenation of an oxalate can give arise to ethylene glycol, which is an important industrial chemical. However, ethylene glycol is predominantly prepared via petroleum route currently, and can thus be costly.

A traditional process for producing an oxalate comprises esterification of oxalic acid with an alcohol. This process may require a high cost of production, consume a large amount of energy, produce serious contamination and/or inappropriately use the raw material. Thus, the production of oxalates via the carbon monoxide coupling technique has attracted researchers' attentions worldwide.

As generally known, carbon monoxide can be isolated and extracted from various carbon monoxide-containing mixed gases. The raw gaseous materials that are industrially useful for isolation of carbon monoxide include, for example, natural gas, the synthetic gas converted from petroleum, water gas, semi water gas, tail gases from iron and steel plants, calcium carbide plants and phosphor plants, and the like. The main method for isolating CO that is currently available is a pressure-varying adsorption. Several companies in China have developed new pressure-varying adsorption techniques for isolating carbon monoxide. For example, the highly efficient adsorbers as developed may have an extremely high adsorption capacity and selectivity to carbon monoxide, and are thus capable of solving the difficult problem of isolating high-purity carbon monoxide from a raw gaseous material having a high nitrogen or methane content. It is consequently possible to design and build a large-size carbon monoxide isolation facility. However, the carbon monoxide isolated from a synthetic gas using this technique may generally have a hydrogen content of more than 1%, if a satisfactory yield of carbon monoxide can be ensured. Studies show that the presence of hydrogen may result in a decreased catalytic activity of the catalyst used in the posterior CO coupling reaction, until the reaction stops. Thus, it is beneficial to develop techniques of selective dehydrogenation of carbon monoxide.

Provided herein is a process for selective oxidative dehydrogenation of a hydrogen-containing CO mixed gas, comprising contacting a hydrogen-containing CO mixed gas raw material with at least one catalyst entity having an increased activity gradient disposed in a reactor, wherein the at least one catalyst entity comprises at least one layer. In some embodiments, the molar ratio of oxygen to hydrogen in the raw material ranges from 0.5:1 to 5:1. In some embodiments, the process for selective oxidative dehydrogenation of a hydrogen-containing CO mixed gas disclosed herein is conducted under at least one reaction condition chosen from a reaction temperature ranging from 100 to 300° C., a volume space velocity ranging from 100 to 10000 h$^{-1}$, and a reaction pressure ranging from −0.08 to 5.0 MPa. In further embodiments, hydrogen in the raw material can be oxidized to water during the process in the reaction effluent.

In some embodiments, the catalyst entity having an increased activity gradient is disposed in a composite bed reactor and comprises at least one catalyst I and at least one catalyst II, wherein the catalyst I and catalyst II both comprise at least one active component chosen independently from platinum group metals, such as platinum (Pt), palladium (Pd), osmium (Os), Iridium (Ir), Ruthenium (Ru), and Rhodium (Rh). In some embodiments, the weight percentage of the at least one active component in the catalyst I is lower than the weight percentage of the at least one active component in the catalyst II. In further embodiments, the weight ratio of the catalyst I to the catalyst II ranges from 0.1:1 to 5:1, for example, from 0.1:1 to 3:1.

In some embodiments, the catalyst entity having an increased activity gradient is disposed in a mixed bed reactor and comprises at least one inert filler and at least one catalyst III comprising at least one active component chosen from platinum group metals, such as platinum (Pt), palladium (Pd), osmium (Os), Iridium (Ir), Ruthenium (Ru), and Rhodium (Rh). In some embodiments, the weight ratio of the inert filler to the catalyst III ranges from 0.1:1 to 5:1, for example, from 0.1:1 to 3:1.

In some embodiments, the catalysts I, II, and III all independently comprise at least one support component chosen from silicon oxide, aluminum oxide, and molecular sieve, such as ZSM-5.

In some embodiments, the catalysts I, II and III all independently comprise at least one active component that is palladium.

In some embodiments, the catalysts I, II and III may optionally comprise at least one additional dopant metal.

In some embodiments, the at least one additional dopant metal is chosen from Ba, Fe, Zn, Lanthanides, Li, and Mn.

In some embodiments, the amount of the at least one active component of the catalyst I ranges from 0.005 to 0.1% by weight, such as from 0.01 to 0.1% by weight, relative to the weight of the support.

In some embodiments, the amount of the at least one active component of the catalyst II ranges from 0.1 to 1.5% by weight, such as from 0.1 to 1% by weight, relative to the weight of the support.

In some embodiments, the amount of the at least one active component of the at least one catalyst III ranges from 0.05 to 1.5% by weight, such as from 0.05 to 1.0% by weight, relative to the weight of the support.

In some embodiments, the at least one inert filler is chosen from inert aluminum oxide, porcelain beads, and stainless steel filler.

In some embodiments, the at least one inert filler is chosen from inert aluminum oxide and porcelain beads.

In some embodiments, the at least one reaction condition is chosen from a reaction temperature ranging from 150 to 280° C., for example, from 180 to 260° C.; a volume space velocity ranging from 800 to 8000 h$^{-1}$, for example, from 1000 to 6000 h$^{-1}$; and a reaction pressure ranging from 0 to 2.0 MPa, for example, from 0 to 1.0 MPa.

In some embodiments, the percent by volume of hydrogen in the hydrogen-containing CO gas raw material ranges from greater than 0 to less than or equal to 10%, for example, ranging from 0.01 to 5%.

In some embodiments, the weight ratio of the catalyst I to the catalyst II ranges from 0.1:1 to 3:1, in, for example, a composite bed reactor.

In some embodiments, the weight ratio of the at least one inert filler to the at least one catalyst III ranges from 0.1:1 to 3:1, in, for example, a mixed bed reactor.

In some embodiments, the molar ratio of oxygen to hydrogen in the raw material ranges from 0.5:1 to 3:1.

As generally known, carbon monoxide and hydrogen are both gases having relatively strong reductibility. When they are present together with oxygen, selective oxidative dehydrogenation can occur together with an oxidation of CO, which may result in a relatively big loss of CO. There may exist even some cases where only CO reacts but hydrogen does not. Thus, it can be a challenging task to develop a high-selectivity dehydrogenation process in the presence of CO. The process disclosed herein can result in little or no CO loss. In some embodiments, the CO mixed gas obtained after the selective oxidative dehydrogenation has a hydrogen concentration of 8 ppm, such as ≤5 ppm, further such as ≤1 ppm. Further dynamic studies show that, during the process for selective dehydrogenation of a hydrogen-containing CO gas as disclosed herein, the adsorption rate of hydrogen to a catalytic active center can be far higher than the adsorption rate of CO, and the reaction activation energy of the step of reacting CO with oxygen to generate $CO_2$ can be far higher than that of the step of reacting hydrogen with oxygen to generate water. This may provide an important theoretical basis and support, from the angle of reaction kinetics, for the maximum transformation of hydrogen and, at the same time, the utmost avoidance of CO loss resulting from oxidation.

Likewise, as generally known, the reaction of hydrogen with oxygen is a strongly exothermic reaction, and dynamic studies show that the rate of the hydrogen/oxygen reaction can be closely associated with the distribution of the active components of the catalysts. Higher distribution percentage of the active components per one unit of support specific area may accelerate the reaction, which can lead to higher increase of local temperature. Higher temperature may increase the probability for CO to react with oxygen, resulting in higher CO loss. Thus, it can be possible to decrease or avoid CO loss by keeping the reaction procedure balanced and preventing an overly high local temperature increase.

In some embodiments, a composite bed reactor is used. The distribution concentration of the catalytic active components is relatively low at the inlet of the reactor, and then increases gradually. This, on one hand, can avoid an overly high rate of reaction between hydrogen and oxygen at the inlet of the reactor, and on the other hand, may sufficiently ensure the hydrogen removal ratio due to an increased concentration of active components downstream of the reactor, hence being capable of achieving the object of effectively increasing the hydrogen removal ratio and significantly decreasing the CO loss.

In some embodiments, a mixed bed reactor is used. At least one inert filler is filled in this reactor together with at least one catalyst III. This may not only effectively decrease the distribution concentration of the active components of the catalyst in one volume unit of the reactor bed layer to effectively avoid an overly high local reaction rate, but may also effectively expedite the heat transfer and decentralize the heat due to the introduction of the at least one inert filler, which can act as a heat carrier, hence avoiding an overly high CO loss resulting from an overly high increase of the local temperature. As disclosed herein, the at least one inert filler and the at least one catalyst III may be filled into the mixed bed rector in many ways, and the weight ratio of the at least one inert filler to the at least one catalyst may be high at the inlet of the reactor, and then gradually decrease along the catalyst bed layer. Accordingly, the distribution concentration of the catalytic active components may be relatively low at the inlet of the reactor, and then may increase gradually. This, on one hand, may avoid an overly high rate of reaction between hydrogen and oxygen at the inlet of the reactor, and on the other hand, may also sufficiently ensure the hydrogen removal ratio due to an increased concentration of active components downstream of the reactor, hence capable of achieving the object of effectively increasing the hydrogen removal ratio and significantly decreasing the CO loss.

In some embodiment, the CO mixed gas obtained after the selective oxidative dehydrogenation has a CO loss of lower than 1%, and a hydrogen concentration of ≤8 ppm, such as ≤5 ppm, further such as ≤1 ppm.

The CO loss as disclosed herein is calculated according to the following equation:

CO loss=(the mass of CO in the raw material−the mass of CO in the product)/the mass of CO in the product×100%.

The following Examples serve to illustrate the disclosure without limiting the scope thereof.

EXAMPLE 1

Catalyst Preparation:

100 g of aluminum oxide support with a specific surface area of 50 m$^2$/g was used to formulate a catalyst with the content of 0.05% Pd/Al$_2$O$_3$ (the percentages of the active components herein are calculated based on weight relative to the total weight of the support) as follows: palladium nitrate was used with water to formulate an impregnation liquid according to the palladium load. The aluminum oxide support was impregnated with this liquid for 10 hours and then dried in vacuum for 12 hours to obtain an impregnated aluminum oxide support. The impregnated aluminum oxide support was then dried at 120° C. for 4 hours, calcined at 450° C. for 6 hours and then reduced with hydrogen at 300° C. for 4 hours to form the desired 0.05% Pd/Al$_2$O$_3$ catalyst I.

The desired 0.5% Pd/Al$_2$O$_3$ catalyst II was prepared according to the above steps.

Catalysts I and II were respectively used in desired amounts according to a weight ratio of catalyst I to catalyst II of 1:1, and catalyst II and catalyst I were then filled into a reactor sequentially. A CO gaseous material having a hydrogen content of 1% by volume was used as the raw material. The raw material was contacted with catalyst I and catalyst II sequentially and reacted, with a molar ratio of oxygen to hydrogen in the raw material being 0.8:1, and at a reaction temperature of 150° C., a volume space velocity of 500 h$^{-1}$, and a reaction pressure of 3.0 MPa in the composite bed reactor. The reaction results (measured with an HP7890 gas chromatograph and a TCD detector, the same below) showed a CO loss of 0.3% and a hydrogen content of 1 ppm in the reaction effluent.

EXAMPLE 2

0.08% Pd/Al$_2$O$_3$, catalyst I and 0.8% Pd/Al$_2$O$_3$, catalyst II were prepared according to the process described in Example 1 for preparing catalysts.

Catalysts I and II were respectively used in desired amounts according to a weight ratio of catalyst I to catalyst II of 2:1, and catalyst II and catalyst I were then filled into a reactor sequentially. A CO gaseous material having a hydrogen content of 3% by volume was used as the raw material. The raw material was contacted with catalyst I and catalyst II sequentially and reacted, with a molar ratio of oxygen to the hydrogen in the raw material being 2:1, and at a reaction temperature of 180° C., a volume space velocity of 1500 $h^{-1}$, and a reaction pressure of 2.0 MPa in the composite bed reactor. The reaction results showed a CO loss of 0.5% and a hydrogen content of 3 ppm in the reaction effluent.

EXAMPLE 3

0.02% Pd/$Al_2O_3$, catalyst I and 1.2% Pd/$Al_2O_3$, catalyst II were prepared according to the process described in Example 1 for preparing catalysts.

Catalysts I and II were respectively used in desired amounts according to a weight ratio of catalyst I to catalyst II of 0.2:1, and catalyst II and catalyst I were then filled into a reactor sequentially. A CO gaseous material having a hydrogen content of 0.3% by volume was used as the raw material. The raw material was contacted with catalyst I and catalyst II sequentially and reacted, with a molar ratio of oxygen to hydrogen in the raw material being 5:1, and at a reaction temperature of 200° C., a volume space velocity of 5000 $h^{-1}$, and a reaction pressure of 0.05 MPa in the composite bed reactor. The reaction results showed a CO loss of 0.6% and a hydrogen content of 0 in the reaction effluent.

EXAMPLE 4

0.1% Pd+0.6% Ba+0.2% Fe/silicon oxide, catalyst I, and 1.0% Pd+0.2% Zn/$Al_2O_3$, catalyst II were prepared according to the process described in Example 1 for preparing catalysts.

Catalysts I and II were respectively used in desired amounts according to a weight ratio of catalyst I to catalyst II of 0.4:1, and catalyst II and catalyst I were then filled into a reactor sequentially. A CO gaseous material having a hydrogen content of 0.8% by volume was used as the raw material. The raw material was contacted with catalyst I and catalyst II sequentially and reacted, with a molar ratio of oxygen to the hydrogen in the raw material being 1:1, and at a reaction temperature of 240° C., a volume space velocity of 6000 $h^{-1}$, and a reaction pressure of −0.05 MPa in the composite bed reactor. The reaction results showed a CO loss of 0.4% and a hydrogen content of 5 ppm in the reaction effluent.

EXAMPLE 5

0.08% Pd+0.4% Fe/ZSM-5 (a silicon to aluminum molar ratio of 500:1), catalyst I, and 0.80% Pd+0.2% La/$Al_2O_3$, catalyst II were prepared according to the process described in Example 1 for preparing catalysts.

Catalysts I and II were respectively used in desired amounts according to a weight ratio of catalyst I to catalyst II of 0.8:1, and catalyst II and catalyst I were then filled into a reactor sequentially. A CO gaseous material having a hydrogen content of 2% by volume was used as the raw material. The raw material was contacted with catalyst I and catalyst II sequentially and reacted, with a molar ratio of oxygen to the hydrogen in the raw material being 0.6:1, and at a reaction temperature of 280° C., a volume space velocity of 8000 $h^{-1}$, and a reaction pressure of −0.02 MPa in the composite bed reactor. The reaction results showed a CO loss of 0.2% and a hydrogen content of 6 ppm in the reaction effluent.

EXAMPLE 6

0.08% Pd/$Al_2O_3$, catalyst I, and 0.6% Pd+0.2% Fe/$Al_2O_3$, catalyst II were prepared according to the process described in Example 1 for preparing catalysts.

Catalysts I and II were respectively used in desired amounts according to a weight ratio of catalyst I to catalyst II of 0.5:1, and catalyst II and catalyst I were then filled into a reactor sequentially. A CO gaseous material having a hydrogen content of 5% by volume was used as the raw material. The raw material was contacted with catalyst I and catalyst II sequentially and reacted, with a molar ratio of oxygen to the hydrogen in the raw material being 1.5:1, and at a reaction temperature of 200° C., a volume space velocity of 3000 $h^{-1}$, and a reaction pressure of 0.2 MPa in the composite bed reactor. The reaction results showed a CO loss of 0.8% and a hydrogen content of 8 ppm in the reaction effluent.

EXAMPLE 7

0.07% Pd+0.3% Li/$Al_2O_3$, catalyst I, and 0.6% Pd+0.2% Mn/ZSM-5 (a silicon to aluminum molar ratio of 200:1), catalyst II were prepared according to the process described in Example 1 for preparing catalysts.

Catalysts I and II were respectively used in desired amounts according to a weight ratio of catalyst I to catalyst II of 4:1, and catalyst II and catalyst I were then filled into a reactor sequentially. A CO gaseous material having a hydrogen content of 8% by volume was used as the raw material. The raw material was contacted with catalyst I and catalyst II sequentially and reacted, with a molar ratio of oxygen to the hydrogen in the raw material being 0.6:1, and at a reaction temperature of 190° C., a volume space velocity of 2000 $h^{-1}$, and a reaction pressure of 0.8 MPa in the composite bed reactor. The reaction results showed a CO loss of 0.5% and a hydrogen content of 5 ppm in the reaction effluent.

EXAMPLE 8

0.09% Pd/$Al_2O_3$, catalyst I, and 0.8% Pd/$Al_2O_3$, catalyst II were prepared according to the process described in Example 1 for preparing catalysts.

Catalysts I and II were respectively used in desired amounts according to a weight ratio of catalyst I to catalyst II of 0.3:1, and catalyst II and catalyst I were then filled into a reactor sequentially. A CO gaseous material having a hydrogen content of 0.2% by volume was used as the raw material. The raw material was contacted with catalyst I and catalyst II sequentially and reacted, with a molar ratio of oxygen to hydrogen in the raw material being 0.6:1, and at a reaction temperature of 220° C., a volume space velocity of 5000 $h^{-1}$, and a reaction pressure of 0.3 MPa in the composite bed reactor. The reaction results showed a CO loss of 0.2% and a hydrogen content of 0 in the reaction effluent.

EXAMPLE 9

0.06% Pt/$Al_2O_3$, catalyst I, and 0.4% Pd/$Al_2O_3$, catalyst II were prepared according to the process described in Example 1 for preparing catalysts, except that platinum nitrate was used with water to formulate an impregnation liquid according to the platinum load.

Catalysts I and II were respectively used in desired amounts according to a weight ratio of catalyst I to catalyst II of 0.2:1, and catalyst II and catalyst I were then filled into a reactor sequentially. A CO gaseous material having a hydrogen content of 0.2% by volume was used as the raw material. The raw material was contacted with catalyst I and catalyst II in turn and reacted, with a molar ratio of oxygen to hydrogen in the raw material being 0.6:1, and at a reaction temperature of 220° C., a volume space velocity of 5000 $h^{-1}$, and a reaction pressure of 0.3 MPa in the composite bed reactor. The reaction results showed a CO loss of 0.1% and a hydrogen content of 0 in the reaction effluent.

COMPARATIVE EXAMPLE 1

The steps described in Example 1 were carried out under the same conditions as described therein, except that only catalyst II was used as the catalyst. At the same total space velocity, oxygen to hydrogen ratio in the raw material, reaction temperature, and reaction pressure, the reaction results showed a CO loss of 0.88% and a hydrogen content of 15 ppm in the reaction effluent.

The CO loss in Example 1 was significantly lower than that in Comparative Example 1, and the hydrogen removal amount in Example 1 is much higher than that in Comparative Example 1.

EXAMPLE 10

Catalyst Preparation:

100 g of aluminum oxide support with a specific surface area of 50 $m^2$/g was used to formulate a catalyst III with content of 0.5% Pd/$Al_2O_3$ as follows: palladium nitrate was used with water to formulate an impregnation liquid according to the palladium load. The aluminum oxide support was impregnated with this liquid for 10 hours and then dried in vacuum for 12 hours to obtain an impregnated aluminum oxide. The impregnated aluminum oxide was then dried at 120° C. for 4 hours, calcined at 450° C. for 6 hours and then reduced with hydrogen at 300° C. for 4 hours to form the desired 0.5% Pd/$Al_2O_3$ catalyst III.

An inert aluminum oxide was used as the inert filler. The inert filler and the catalyst III were filled at a gradually decreasing weight ratio of from 0.5:1 to 0.1:1 from the inlet to the outlet of the reactor. A CO gaseous material having a hydrogen content of 1% by volume was used as the raw material. The raw material was contacted with the catalyst III by passing through a mixed bed reactor filled with the inert filler and the catalyst III, and reacted, with a molar ratio of oxygen to hydrogen in the raw material being 0.8:1, and at a reaction temperature of 150° C., a volume space velocity of 500 $h^{-1}$, and a reaction pressure of 3.0 MPa in the mixed bed reactor. The reaction results showed a CO loss of 0.3% and a hydrogen content of 1 ppm in the reaction effluent.

EXAMPLE 11

0.8% Pd/$Al_2O_3$, catalyst III, was prepared according to the process described in Example 10 for preparing a catalyst.

An inert aluminum oxide was used as the inert filler. The inert filler and the catalyst III were filled at a gradually decreasing weight ratio of from 1:1 to 0.1:1 from the inlet to the outlet of the reactor. A CO gaseous material having a hydrogen content of 3% by volume was used as the raw material. The raw material was contacted with the catalyst III by passing through a mixed bed reactor filled with the inert filler and the catalyst III, and reacted, with a molar ratio of oxygen to hydrogen in the raw material being 2:1, and at a reaction temperature of 180° C., a volume space velocity of 1500 $h^{-1}$, and a reaction pressure of 2.0 MPa in the mixed bed reactor. The reaction results showed a CO loss of 0.4% and a hydrogen content of 3 ppm in the reaction effluent.

EXAMPLE 12

1.2% Pd/$Al_2O_3$, catalyst III, was prepared according to the process described in Example 10 for preparing a catalyst.

Inert porcelain beads were used as the inert filler. The inert filler and the catalyst III were filled at a gradually decreasing weight ratio of from 2:1 to 0.8:1 from the inlet to the outlet of the reactor. A CO gaseous material having a hydrogen content of 0.3% by volume was used as the raw material. The raw material was contacted with the catalyst III by passing through a mixed bed reactor filled with the inert filler and the catalyst III, and reacted, with a molar ratio of oxygen to hydrogen in the raw material being 5:1, and at a reaction temperature of 200° C., a volume space velocity of 5000 $h^{-1}$, and a reaction pressure of 0.05 MPa in the mixed bed reactor. The reaction results showed a CO loss of 0.5% and a hydrogen content of 0 in the reaction effluent.

EXAMPLE 13

0.1% Pd+0.6% Ba+0.2% Fe/silicon oxide, catalyst III, was prepared according to the process described in Example 10 for preparing a catalyst.

Inert porcelain beads were used as the inert filler. The inert filler and the catalyst III were filled at a gradually decreasing weight ratio of from 2:1 to 0.2:1 from the inlet to the outlet of the reactor. A CO gaseous material having a hydrogen content of 0.8% by volume was used as the raw material. The raw material was contacted with the catalyst III by passing through a mixed bed reactor filled with the inert filler and the catalyst III, and reacted, with a molar ratio of oxygen to hydrogen in the raw material being 1:1, and at a reaction temperature of 240° C., a volume space velocity of 6000 $h^{-1}$, and a reaction pressure of −0.05 MPa in the mixed bed reactor. The reaction results showed a CO loss of 0.3% and a hydrogen content of 5 ppm in the reaction effluent.

EXAMPLE 14

0.8% Pd+0.4% Fe/ZSM-5 (a silicon to aluminum molar ratio of 500:1), catalyst III, was prepared according to the process described in Example 10 for preparing a catalyst.

A stainless steel filler was used as the inert filler. The inert filler and the catalyst III were filled at a gradually decreasing ratio of from 4:1 to 0.1:1 from the inlet to the outlet of the reactor. A CO gaseous material having a hydrogen content of 2% by volume was used as the raw material. The raw material was contacted with the catalyst III by passing through a mixed bed reactor filled with the inert filler and the catalyst III, and reacted, with a molar ratio of oxygen to hydrogen in the raw material being 0.6:1, and at a reaction temperature of 280° C., a volume space velocity of 8000 $h^{-1}$, and a reaction pressure of −0.02 MPa in the mixed bed reactor. The reaction results showed a CO loss of 0.2% and a hydrogen content of 6 ppm in the reaction effluent.

EXAMPLE 15

0.6% Pd/$Al_2O_3$, catalyst III, was prepared according to the process described in Example 10 for preparing a catalyst.

A stainless steel filler was used as the inert filler. The inert filler and the catalyst III were filled at a gradually decreasing weight ratio of from 5:1 to 0.6:1 from the inlet to the outlet of the reactor. A CO gaseous material having a hydrogen content of 5% by volume was used as the raw material. The raw material was contacted with the catalyst III by passing through a mixed bed reactor filled with the inert filler and the catalyst III, and reacted, with a molar ratio of oxygen to hydrogen in the raw material being 1.5:1, and at a reaction temperature of 200° C., a volume space velocity of 3000 h$^{-1}$, and a reaction pressure of 0.2 MPa in the mixed bed reactor. The reaction results showed a CO loss of 0.6% and a hydrogen content of 8 ppm in the reaction effluent.

EXAMPLE 16

0.6% Pd+0.2% Mn/ZSM-5 (a silicon to aluminum molar ratio of 200:1), catalyst III, was prepared according to the process described in Example 10 for preparing a catalyst.

An inert aluminum oxide was used as the inert filler. The inert filler and the catalyst III were filled at a gradually decreasing weight ratio of from 1:1 to 0.5:1 from the inlet to the outlet of the reactor. A CO gaseous material having a hydrogen content of 8% by volume was used as the raw material. The raw material was contacted with the catalyst III by passing through a mixed bed reactor filled with the inert filler and the catalyst III, and reacted, with a molar ratio of oxygen to hydrogen in the raw material being 0.6:1, and at a reaction temperature of 190° C., a volume space velocity of 2000 h$^{-1}$, and a reaction pressure of 0.8 MPa in the mixed bed reactor. The reaction results showed a CO loss of 0.5% and a hydrogen content of 5 ppm in the reaction effluent.

EXAMPLE 17

0.2% Pt/Al$_2$O$_3$, catalyst III, was prepared according to the process described in Example 10 for preparing a catalyst, except that platinum nitrate was used with water to formulate an impregnation liquid according to the platinum load.

A stainless steel filler was used as the inert filler. The inert filler and the catalyst III were filled at a gradually decreasing ratio of from 2:1 to 0.3:1 from the inlet to the outlet of the reactor. A CO gaseous material having a hydrogen content of 0.2% by volume was used as the raw material. The raw material was contacted with the catalyst III by passing through a mixed bed reactor filled with the inert filler and the catalyst III, and reacted, with a molar ratio of oxygen to the hydrogen comprised in the raw material being 0.6:1, and at a reaction temperature of 220° C., a volume space velocity of 5000 h$^{-1}$, and a reaction pressure of 0.3 MPa in the mixed bed reactor. The reaction results showed a CO loss of 0.2% and a hydrogen content of 0 in the reaction effluent.

EXAMPLE 18

0.1% Pt/Al$_2$O$_3$, catalyst III, was prepared according to the process described in Example 10 for preparing a catalyst, except that platinum nitrate was used with water to formulate an impregnation liquid according to the platinum load.

Inert porcelain beads were used as the inert filler. The inert filler and the catalyst III were filled at a gradually decreasing weight ratio of 2:1 to 0.8:1 from the inlet to the outlet of the reactor. A CO gaseous material having a hydrogen content of 0.2% by volume was used as the raw material. The raw material was contacted with the catalyst III by passing through a mixed bed reactor filled with the inert filler and the catalyst III, and reacted, with a molar ratio of oxygen to hydrogen in the raw material being 0.6:1, and at a reaction temperature of 220° C., a volume space velocity of 5000 h$^{-1}$, and a reaction pressure of 0.3 MPa in the mixed bed reactor. The reaction results showed a CO loss of 0.3% and a hydrogen content of 1 ppm in the reaction effluent.

EXAMPLE 19

0.8% Pt/Al$_2$O$_3$, catalyst III, was prepared according to the process described in Example 10 for preparing a catalyst, except that platinum nitrate was used with water to formulate an impregnation liquid according to the platinum load.

Inert porcelain beads were used as the inert filler. The inert filler and the catalyst III were filled at a gradually decreasing weight ratio of from 3:1 to 0.5:1 from the inlet to the outlet of the reactor. A CO gaseous material having a hydrogen content of 0.2% by volume was used as the raw material. The raw material was contacted with the catalyst III by passing through a mixed bed reactor filled with the inert filler and the catalyst III, and reacted, with a molar ratio of oxygen to hydrogen in the raw material being 0.6:1, and at a reaction temperature of 220° C., a volume space velocity of 5000 h$^{-1}$, and a reaction pressure of 0.3 MPa in the mixed bed reactor. The reaction results were a CO loss of 0.1% and a hydrogen content of 0 in the reaction effluent.

COMPARATIVE EXAMPLE 2

The steps described in Example 10 were carried out under the same conditions described therein, except that only the catalyst III was used and no inert filler was used for dilution. At the same total space velocity, oxygen to hydrogen ratio in the raw material, reaction temperature, and reaction pressure, the reaction results showed a CO loss of 0.9% and a hydrogen content of 13 ppm in the reaction effluent.

The CO loss in Example 10 was significantly lower than that in Comparative Example 2, and the hydrogen removal amount in Example 10 was much higher than that in Comparative Example 2.

What is claimed is:

1. A process for selective oxidative dehydrogenation of a hydrogen-containing CO mixed gas, comprising contacting a hydrogen-containing CO mixed gas raw material with at least one catalyst entity having an increased activity gradient disposed in a reactor, wherein the at least one catalyst entity has at least one layer.

2. The process according to claim 1, wherein the molar ratio of oxygen to hydrogen in the raw material ranges from 0.5:1 to 5:1.

3. The process according to claim 1, wherein the process is conducted under at least one reaction condition chosen from a reaction temperature ranging from 100 to 300° C., a volume space velocity ranging from 100 to 10000 h$^{-1}$, and a reaction pressure ranging from −0.08 to 5.0 MPa.

4. The process accordingly to claim 1, wherein hydrogen in the raw material is oxidized to water during the process in the reaction effluent.

5. The process according to claim 1, wherein the catalyst entity is disposed in a composite bed reactor and comprises at least one catalyst I and at least one catalyst II, wherein the at least one catalyst I and the at least one catalyst II both comprise at least one active component independently chosen from platinum group metals and both optionally comprise at least one additional dopant metal.

6. The process according to claim 5, wherein the weight percentage of the at least one active component in the catalyst I is lower than the weight percentage of the at least one active component in the catalyst II.

7. The process according to claim 5, wherein the weight ratio of the at least one catalyst I to the at least one catalyst II ranges from 0.1:1 to 5:1.

8. The process according to claim 5, wherein the at least one additional dopant metal is independently chosen form Ba, Fe, Zn, Lanthanides, Li, and Mn.

9. The process according to claim 7, wherein the weight ratio of the at least one catalyst I to the at least one catalyst II ranges from 0.1:1 to 3:1.

10. The process according to claim 1, wherein the catalyst entity is disposed in a mixed bed reactor and comprises at least one inert filler and at least one catalyst III comprising at least one active component chosen from platinum group metals, wherein the at least one catalyst III may optionally comprise at least one additional dopant metal.

11. The process according to claim 10, wherein the weight ratio of the at least one inert filler to the at least one catalyst III ranges from 0.1:1 to 5:1.

12. The process according to claim 10, wherein the at least one additional dopant metal is chosen from Ba, Fe, Zn, Lanthanides, Li, and Mn.

13. The process according to claim 11, wherein the weight ratio of the at least one inert filler to the at least one catalyst III ranges from 0.1:1 to 3:1.

14. The process according to claim 5, wherein the at least one catalyst I and the at least one catalyst II both comprise at least one support component chosen from silicon oxide, aluminum oxide, and molecular sieves.

15. The process according to claim 14, wherein the amount of the at least one active component of the at least one catalyst I ranges from 0.005 to 0.1% by weight relative to the weight of the support.

16. The process according to claim 14, wherein the amount of the at least one active component of the at least one catalyst II ranges from 0.1 to 1.5% by weight relative to the weight of the support.

17. The process according to claim 14, wherein the at least one catalyst I and the at least one catalyst II both comprise silicon oxide.

18. The process according to claim 10, wherein the at least one catalyst III comprises at least one support component chosen from silicon oxide, aluminum oxide, and molecular sieves.

19. The process according to claim 18, wherein the amount of the at least one active component of the at least one catalyst III ranges from 0.05 to 1.5% by weight relative to the weight of the support.

20. The process according to claim 10, wherein the at least one inert filler is chosen from inert aluminum oxide, porcelain beads and stainless steel filler.

21. The process according to claim 18, wherein the at least one catalyst III comprises silicone oxide.

22. The process according to claim 20, wherein the at least one inert filler is chosen from inert aluminum oxide and porcelain beads.

23. The process according to claim 3, wherein the at least one reaction condition is chosen from the reaction temperature ranging from 150 to 280° C., the volume space velocity ranging from 800 to 8000 $h^{-1}$, and the reaction pressure ranging from 0 to 2.0 MPa.

24. The process according to claim 23, wherein the at least one reaction condition is chosen from the reaction temperature ranging from 180 to 260° C., the volume space velocity ranging from 1000 to 6000 $h^{-1}$, and the reaction pressure ranging from 0 to 1.0 MPa.

25. The process according to claim 1, wherein the amount of the hydrogen in the raw material ranges from greater than 0 to less than or equal to 10% by volume relative to the total volume of the raw material.

26. The process according to claim 25, wherein the amount of the hydrogen in the raw material ranges from 0.01 to 5% by volume relative to the total volume of the raw material.

27. The process according to claim 2, wherein the molar ratio of oxygen to hydrogen in the raw material ranges from 0.5:1 to 3:1.

28. The process according to claim 5, wherein the at least one catalyst I and the at least one catalyst II both comprise at least one active component that is palladium.

29. The process according to claim 10, wherein the at least one catalyst III comprises at least one active component that is palladium.

30. The process according to claim 1, wherein the CO mixed gas obtained after the selective oxidative dehydrogenation has a hydrogen concentration of ≤8 ppm, and a CO loss of <1%.

31. The process according to claim 30, wherein the CO mixed gas obtained after the selective oxidative dehydrogenation has a hydrogen concentration of ≤1 ppm.

* * * * *

UNITED STATES PATENT AND TRADEMARK OFFICE
CERTIFICATE OF CORRECTION

PATENT NO. : 8,574,522 B2
APPLICATION NO. : 13/087798
DATED : November 5, 2013
INVENTOR(S) : Juntao Liu et al.

It is certified that error appears in the above-identified patent and that said Letters Patent is hereby corrected as shown below:

In the Claims:

Claim 7, col. 11, line 2, "catalyst Ito" should read -- catalyst I to --.

Claim 9, col. 11, line 9, "catalyst Ito" should read -- catalyst I to --.

Signed and Sealed this
First Day of April, 2014

Michelle K. Lee
*Deputy Director of the United States Patent and Trademark Office*